(12) United States Patent
Umminger, III

(10) Patent No.: US 6,704,671 B1
(45) Date of Patent: Mar. 9, 2004

(54) SYSTEM AND METHOD OF IDENTIFYING THE ONSET OF A SONIC EVENT

(75) Inventor: Frederick W. Umminger, III, Sunnyvale, CA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/359,186

(22) Filed: Jul. 22, 1999

(51) Int. Cl.⁷ .................. G11B 27/029; G11B 27/036
(52) U.S. Cl. .................. 702/69; 381/56; 381/58; 381/94.1; 367/901; 360/13; 84/616; 704/278
(58) Field of Search .................. 367/901; 381/56, 381/57, 58, 94.7, 72, 60, 94.8, 94.1, 71.1; 702/66, 67, 69; 360/13; 352/11; 327/551; 708/300; 84/616; 704/278

(56) References Cited

U.S. PATENT DOCUMENTS

| | | | |
|---|---|---|---|
| 4,067,049 A | 1/1978 | Kelly et al. | 389/54 |
| 4,453,809 A | 6/1984 | Hill et al. | 352/11 |
| 4,554,858 A * | 11/1985 | Wachi et al. | 84/1.19 |
| 4,591,928 A | 5/1986 | Bloom et al. | 360/13 |
| 4,631,683 A * | 12/1986 | Thomas et al. | 364/474 |
| 4,827,458 A * | 5/1989 | D'Alayer et al. | 367/136 |
| 4,829,872 A | 5/1989 | Topic et al. | 84/453 |
| 5,040,081 A | 8/1991 | McCutchen | 386/66 |
| 5,430,244 A | 7/1995 | Ruffcorn et al. | 84/669 |
| 5,467,288 A | 11/1995 | Fasciano et al. | 345/716 |
| 5,623,609 A | 4/1997 | Kaye et al. | 704/1 |
| 5,634,020 A | 5/1997 | Norton | 345/727 |
| 5,710,387 A * | 1/1998 | Szalay | 84/663 |
| 5,756,917 A | 5/1998 | Watanabe et al. | 84/634 |
| 5,982,447 A | 11/1999 | Nakamura | 348/515 |
| 6,028,944 A * | 2/2000 | Markow et al. | 381/120 |
| 6,047,023 A * | 4/2000 | Arnstein | 375/229 |
| 6,075,475 A * | 6/2000 | Ellis | 341/144 |
| 6,184,898 B1 | 2/2001 | Rice et al. | 345/440 |

\* cited by examiner

Primary Examiner—Marc S. Hoff
Assistant Examiner—Paul Kim
(74) Attorney, Agent, or Firm—Peter J. Gordon

(57) ABSTRACT

The present invention provides for a method and system for identifying a sonic event of interest within a received audio signal. A sonic event is characterized by a predetermined rate of change in the perceived audio volume, and is associated with the loudness of the audio. The present invention detects a sonic event such as a percussive hit without requiring that the detector be disabled for a fixed time to avoid false triggering. Because the detector is not disabled during the detection process, sonic events occurring in close proximity are easily recognized and not ignored as in some conventional systems.

27 Claims, 3 Drawing Sheets

SYSTEM AND METHOD OF IDENTIFYING THE ONSET OF A SONIC EVENT

FIELD OF THE INVENTION

The present invention relates generally to digital signal processing techniques for processing an audio signal and more particularly to digital signal processing techniques for identifying the onset of a sonic event within an audio signal.

BACKGROUND OF THE INVENTION

A common task in the production of a multimedia program involves the editing of the audio signal for the program. Typically, the audio signal is edited to enhance or augment the originally recorded audio. This involves either mixing other audio with the original audio or totally replacing a portion of the audio with new audio. In either case it is necessary to precisely identify the start of an audio segment that is to be edited so that the modified audio will seamlessly fit in with the rest of the audio. Frequently, the point of editing is associated with a particular sonic event such as a percussive hit or other distinctive, loud sound, and thus it becomes necessary to identify these events.

Because of the precision required to locate the onset of a sonic event such as a percussive hit, digital signal processing methods have been implemented on computer systems to detect these events in an automated fashion. Conventionally, an analog audio signal, representing the volume of the audio, is sampled by an Analog-to-Digital (A/D) converter to produce a digital representation of the signal. The sonic event is then identified by comparing the resulting digital values against a threshold value that corresponds to the particular sonic event of interest. If the digital value of the audio exceeds the predetermined threshold value, the sonic event is said to have occurred. While this approach is useful in deciding when the volume of the audio rises above a predetermined level, it has the disadvantage that a sonic event will be triggered for as long as the volume exceeds the threshold value. In other words, if the volume remains above the threshold level for a significant period of time, multiple sonic events are triggered. To avoid this consequence, the detection analysis is typically "turned off" for a fixed interval of time after the initial detection of the sonic event. While disabling the detector for a set time interval may eliminate multiple triggering, it also has the disadvantage that a legitimate sonic event can not be detected during this interval. Thus, information about the audio signal may be lost during the time the detection process is "turned off", and the editing of the audio is necessarily restricted due to the failure of the system to detect the event. Furthermore, false triggers may be generated if the volume continues above the threshold value when detection is resumed after the fixed time interval has expired.

Thus it is desirable to provide for an automated system and method for recognizing the onset of a sonic event that is characterized by a rapid increase in volume without requiring that the detection process be disabled to avoid false triggering of sonic events.

SUMMARY OF THE INVENTION

The present invention provides for a method and system for identifying a sonic event of interest within a received audio signal. A sonic event is characterized by a predetermined rate of change in the perceived audio volume, and is associated with the loudness of the audio.

In one aspect of the invention, examples of a sonic event include percussive hits such as those emanating from drums, cymbals or a piano.

In a further aspect of the invention, a first digital signal corresponding to a filtered digital representation of the audio signal is generated, and a second digital signal representative of the rate of change of the first digital signal is derived from the filtered representation. A sonic event is said to occur when the second digital signal exceeds a predetermined level.

In another aspect of the invention, the digital representation of the audio is high-pass filtered to remove inaudible low frequencies. In one practice of the invention the high-pass filter has a pass band above 20 Hz.

In a yet further aspect of the invention, the energy of the high-pass filtered digital signal is derived and then filtered with a low-pass filter to remove audible frequencies. The low-pass filter advantageously has only real poles to avoid oscillatory transients resulting from the filter "ringing".

In a still further aspect of the invention, a digital signal representative of the perceived volume of the original audio is generated from the low-pass filtered energy signal, differentiated and scaled appropriately to derive a digital signal indicative of a change in the volume that can be compared with a predetermined threshold value for determining the onset of the sonic event of interest.

The method and system according to the present invention advantageously provides for detection of a sonic event such as a percussive hit without requiring that the detector be disabled for a fixed time to avoid false triggering. Furthermore, because the detector is not disabled during the detection process, sonic events occurring in close proximity are easily recognized and not ignored as in some conventional systems.

BRIEF DESCRIPTION OF THE DRAWINGS

A specific embodiment of the invention will now be described, by way of example, with reference to the accompanying drawings in which.

DETAILED DESCRIPTION

Figure 1:
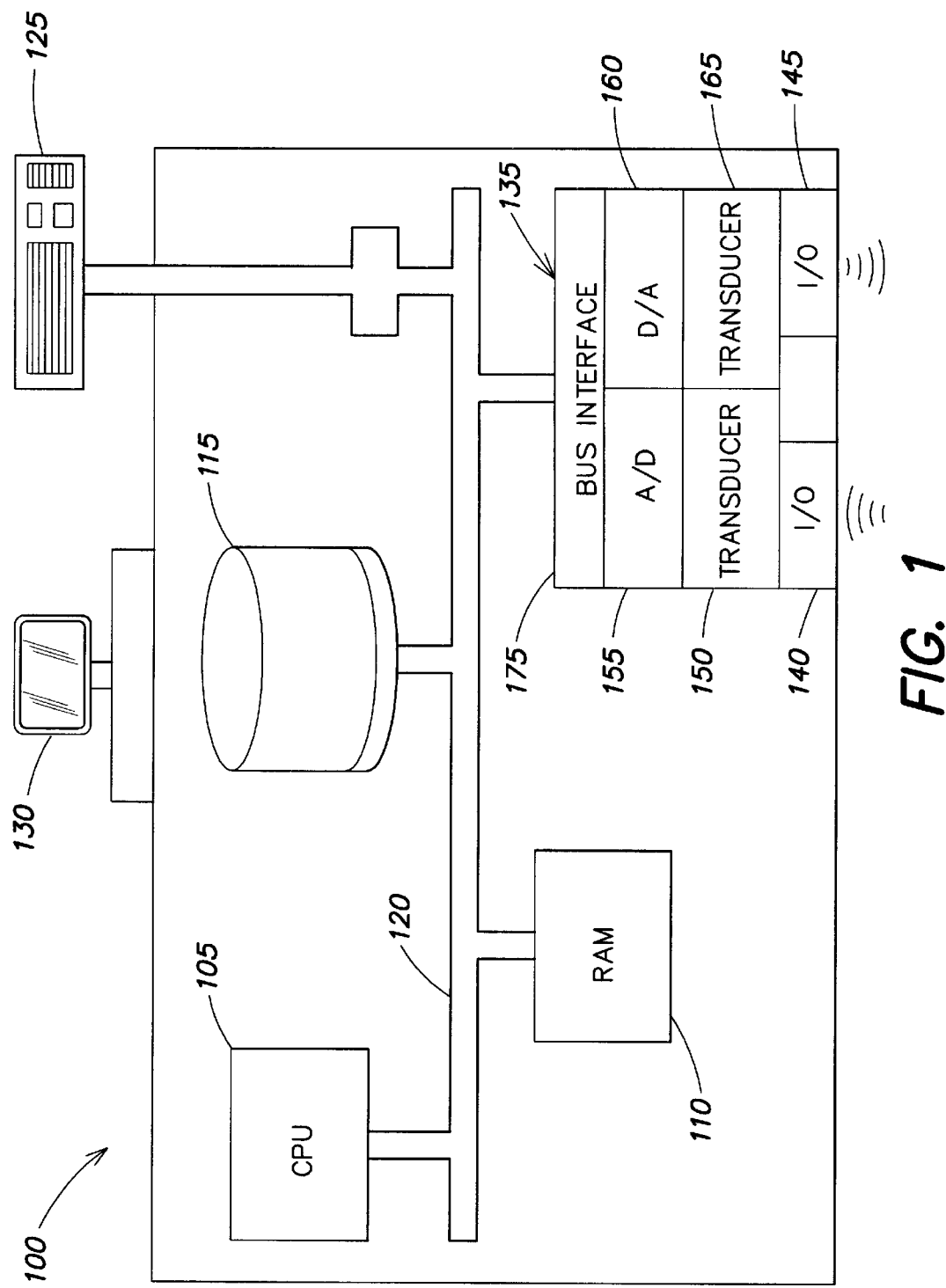
FIG. 1 is a schematic diagram of a computer system suitable for implementing a system for identifying a sonic event according to the present invention.

Referring to FIG. 1 there is a shown as a schematic diagram a computer system for practicing the present invention. The computer system may be programmed using typical computer programming languages such as C or C++ which is then compiled into object code and linked into code executable by the computer system, using a suitable compiler and linker as those of ordinary skill in the art will readily understand. Computer system 100 includes a central processing unit (CPU) 105 for executing computer instructions, a random access memory (RAM) 110 for storing the computer instructions and other data, and a non volatile memory 115 such as a hard disk or CDROM drive for permanently storing data. Computer system 100 further includes a computer bus 120 that allows for communication among the CPU 105, RAM 110, and non-volatile memory 115. An input device 125 such as a keyboard is connected to computer system 100 for entering alphanumeric data into computer system 100. A display monitor 130 is also connected to computer system 100 for displaying text and graphics data generated by the computer system 100.

Computer system 100 includes an audio adapter 135 for receiving and transmitting analog audio signals. The audio adapter 135 includes an audio input port 140 for receiving an audio signal and an audio output port 145 for transmitting an audio signal. Audio input port 140 interfaces to a transducer 150 for converting the acoustic energy received into electrical energy. An Analog-to-Digital (A/D) converter 155 samples the resulting electrical signal corresponding to the electrical energy and generates a digital representation of the signal. Similarly, a digital-to-analog (D/A) converter 160 interfaces to a transducer 165 at audio output port 145 for converting a digital signal to an analog signal, prior to transmission by the transducer 165. The audio adapter 135 includes a computer bus interface 175 for transmitting or receiving digital data over communications bus 120 to or from the other components of the computer system 100.

Computer system 100 may be programmed, for example, by using the computer programming languages referred to above, along with other computer programming languages, to enable the automated detection of a sonic event within an audio signal that is received by the computer system. The present invention provides a system for detecting a sonic event that is implemented in software and executable on the CPU 105 of computer system 100. In the following description it will be assumed that the automated detection of a sonic event such as a percussive hit or distinctive loud sound is the desired objective. In general a sonic event is characterized by a fast rising increase in sound volume for which the rate of increase exceeds a predetermined threshold corresponding to the sonic event of interest.

Figure 2:
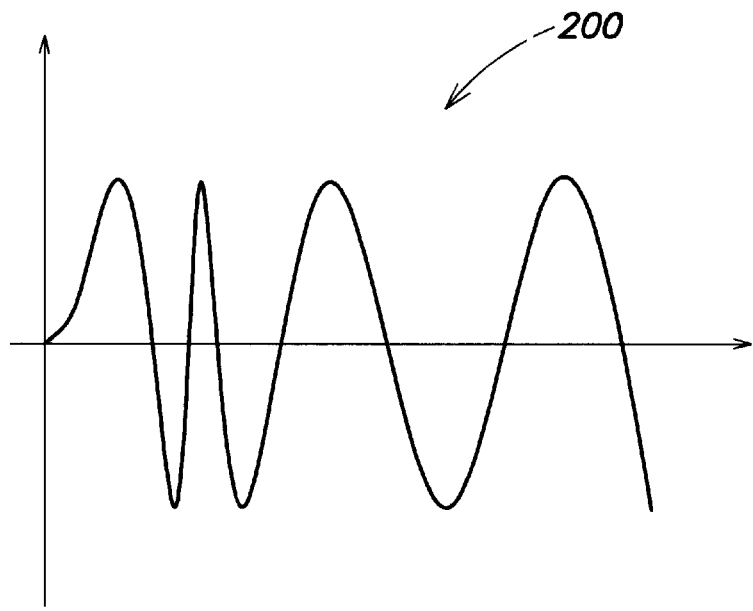
FIG. 2 depicts an analog audio signal.
Figure 3:
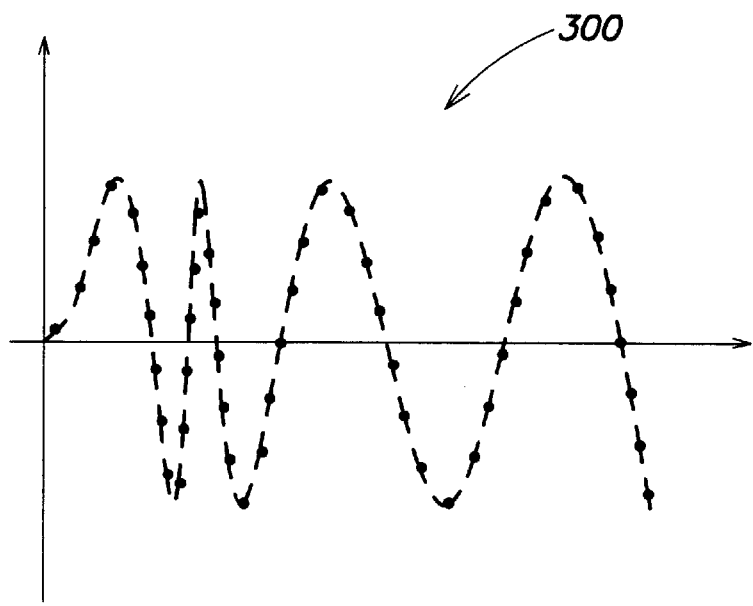
FIG. 3 depicts a sampled digital signal corresponding to the analog audio signal of FIG. 2.

In one practice of the present invention, a stream of audio energy is received by computer system 100 at audio input port 140. The audio may represent voiced or unvoiced audio. Unvoiced audio may include, but is not limited to, sound generated by musical instruments such as a drum, horn, or cymbal and also sounds produced by nature such as thunder. Transducer 150 converts the received acoustic energy to electrical energy, generating an audio signal 200 as shown in FIG. 2 that corresponds to the input stream of audio energy. The audio signal 200 is sampled at periodic intervals by the A/D converter 155 and the resulting sample values are quantized to generate a digital signal 300, as shown in FIG. 3. The audio signal is typically sampled at 44.1 kHz or 48 kHz, but those of ordinary skill in the art will recognize that other sampling rates may be used and still be within the scope of the invention. After the A/D conversion and quantization by audio adapter 135, digital sample values $\{x_i\}$ are produced and sent via computer bus 120 to be stored in the RAM 110 for processing by software implementing the inventive method for identifying the onset of a sonic event. The A/D converter 155 generates 16 or 24 bit values for each $x_i$ sample, depending on the actual A/D converter that is employed. The 16 or 24 bit values are converted to a 32 bit IEEE floating point format with 0 dB as digital full scale. It is the 32 bit IEEE floating point format that is used in carrying out the method of the present invention.

Figure 4:
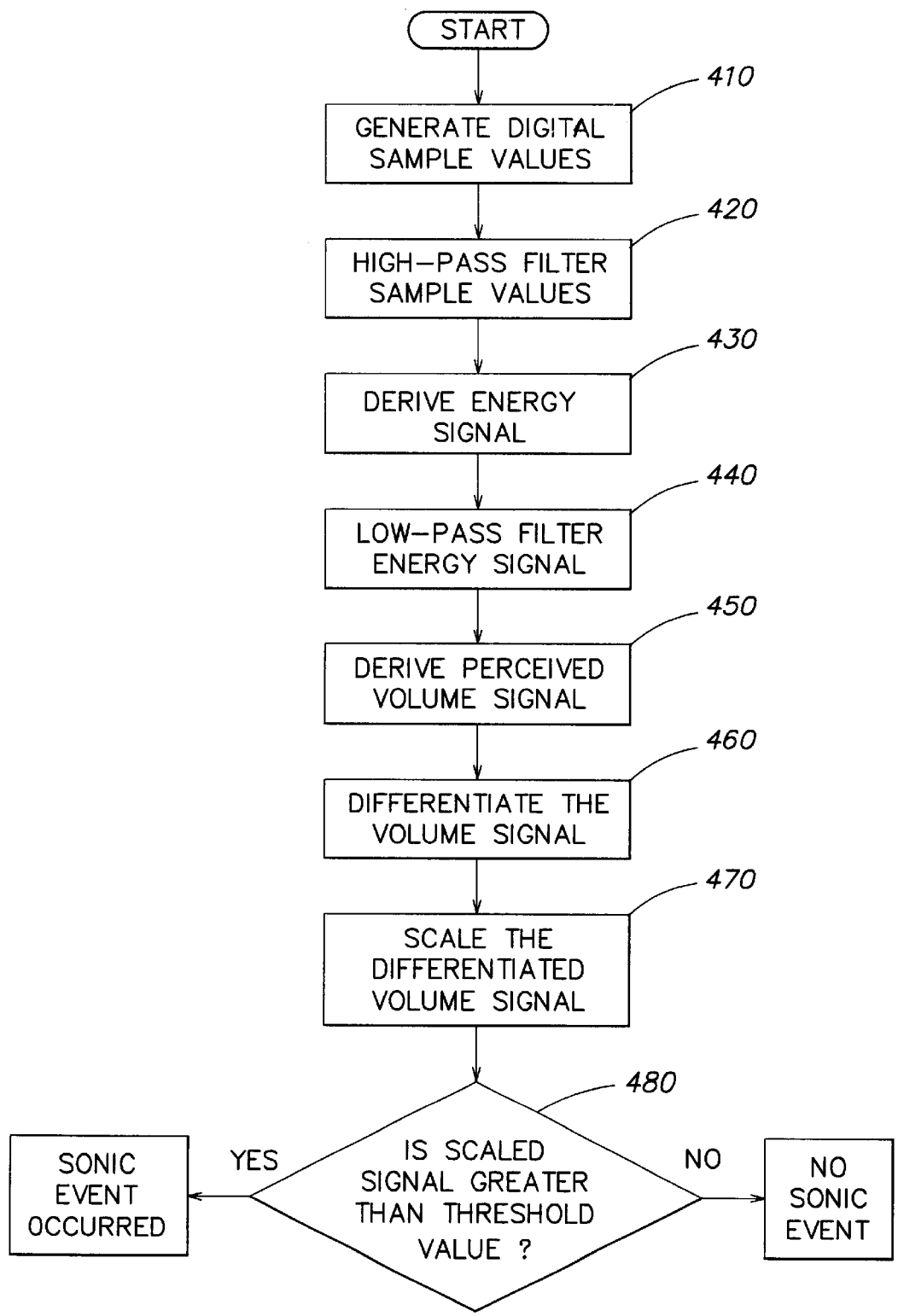
FIG. 4 shows a flow chart of the method of identifying a sonic event within a stream of audio, according to the present invention.

A description of the method by which the software executed on computer system 100 detects a sonic event is now provided with reference to the process chart of FIG. 4. Having generated in step 410 the $\{x_i\}$ digital sample values representing the digital signal 300 corresponding to the original audio signal, the digital signal is high-pass filtered in step 420 to remove inaudible low frequencies below 20 Hz. Since a sonic event is characterized by a rapid increase in sound volume, the audio at these frequencies can not represent such an event. In the preferred embodiment of the invention, the high-pass filter is a second order Butterworth filter with a cut off frequency of 120 Hz. However, those of ordinary skill in the art will recognize that other digital filters are suitable for practicing the invention.

After the high-pass filtering, a new set of digital samples $\{y_i\}$ is generated. In step 430, an energy signal $\{y_i^2\}$ is produced which is representative of the energy found in the $\{y_i\}$ digital samples. In step 440, the resulting energy signal $\{y_i^2\}$ is low-pass filtered to remove audible frequencies. Specifically, the energy signal is low-pass filtered to remove frequencies above approximately 20 Hz. In a preferred embodiment of the invention the low-pass filter employed has real poles to avoid oscillatory transients caused by the filter "ringing". These oscillatory transients may induce a false triggering of the sonic event and thus it is desirable to eliminate these artifacts. In the preferred embodiment of the invention, the low-pass filter is comprised of two cascaded one-pole Butterworth filters with a cut off frequency of 15 Hz. A third order elliptical filter with a cut off frequency of 90 Hz is also suitable for practicing the invention. Those of ordinary skill in the art will recognize that other digital filters are suitable for practicing the invention and are considered within the scope of the invention. By low-pass filtering the energy signal $\{y_i^2\}$ a new energy signal $\{z_i^2\}$ is generated that eliminates frequencies above approximately 20 Hz. In step 450, the positive square root of the $\{z_i^2\}$ digital signal is take to produce a filtered signal $\{z_i\}$ that corresponds to the perceived "loudness" or volume of the original signal.

Because the sonic events of interest are associated with a rapid increase in volume over a very short interval of time, these events can be identified, as shown in step 460, by numerically differentiating the signal $\{z_i\}$ with relation to time to derive a signal $\{z_i'\}$ that represents a measure of the rate of change of the digital signal $\{z_i\}$. Procedures for performing a numerical differentiation are well known to those of ordinary skill in the art. Since the values of the $\{z_i'\}$ signal are very much smaller than the initial values of the $\{x_i\}$, the $\{z_i'\}$ signal is scaled in step 470 to account for this difference. In the preferred embodiment of the invention, the scaling factor is 1024, which corresponds approximately to the detection of a percussive hit. The threshold value is determined experimentally according to the particular sonic event of interest that is to be detected.

The resulting scaled signal $\{Z_i\}$ is compared against a predetermined threshold value that corresponds to the sonic event of interest. The scaling factor adjusts the magnitude of the $\{z_i'\}$ signal values to the range of the initial audio volume so that the threshold value chosen by the user of the system conforms to a range of values consistent with the initial loudness of the audio. Since scaling is performed to accommodate the user in selecting a threshold value corresponding to the sonic event of interest, those of ordinary skill in the art will recognize that other scaling factors than 1024 may be used to practice the invention. The scaling operation is performed to facilitate selection of an appropriate threshold value by the user. If the scaled signal $\{Z_i\}$ exceeds the predetermined threshold set by the user of the system as shown in step 480, the sonic event of interest is said to have occurred.

It is noted that the method described herein for detecting a sonic event of interest advantageously continues comparing the selected threshold value representing the event to the scaled signal $\{Z_i\}$ regardless to whether a sonic event was previously detected in order to detect further such events. In comparison to conventional methods of detecting a sonic event, the detector is not disabled for an interval of time in order to avoid false triggering. Consequently, the method of the present invention eliminates the window when the detector is not capable of detecting the desired event.

Having described the invention, it should be apparent to those of ordinary skill in the art that the foregoing is illustrative and not limiting. Numerous modifications and other embodiments are within the scope of one of ordinary skill in the art and are contemplated as falling within the scope of the invention as defined by the appended claims.

We claim:

1. A method for editing received audio by detecting an onset of a sonic event of interest in the received audio, comprising:
    generating a first digital signal representative of perceived volume of the received audio;
    deriving a second digital signal corresponding to the rate of change of the first digital signal;
    identifying a time in the received audio at which the derived rate of change exceeds a threshold as the onset of the sonic event of interest; and
    editing the received audio to insert an audio clip at a point in time in the received audio related to the onset of the sonic event of interest.

2. The method of claim 1, wherein detecting further includes:
    comparing said second digital signal to a threshold value corresponding to the sonic event of interest and reporting the onset of the sonic event of interest if the said second digital signal exceeds the threshold value.

3. The method of claim 1, wherein generating further includes
    high-pass filtering the received audio to eliminate low frequencies.

4. The method of claim 2, wherein generating further includes
    high-pass filtering the received audio to eliminate low frequencies.

5. The method of claim 4, wherein generating further includes
    generating a digital energy signal corresponding to the high-pass filtered received audio.

6. The method of claim 5, wherein generating further includes
    low-pass filtering of the digital energy signal to remove audible frequencies.

7. The method of claim 6, wherein low-pass filtering includes filtering the digital energy signal with a filter having only real poles to avoid oscillatory transients and producing a low-pass filtered energy signal.

8. The method of claim 7, wherein the filter includes a Butterworth filter.

9. The method of claim 7, wherein the filter includes two cascaded one-pole Butterworth filters with a cut off frequency of 15 Hz.

10. The method of claim 8, wherein generating further includes
    producing the first digital signal from the low-pass filtered energy signal.

11. The method of claim 10, wherein producing includes taking a square root of the low-pass filtered energy signal.

12. The method of claim 1, further including scaling the second digital signal prior to detecting the onset of the sonic event of interest.

13. A method for editing received audio by detecting an onset of a sonic event of interest in the received audio, comprising:
    generating a first digital signal representative of perceived volume of the received audio;
    deriving a second digital signal representative of the rate of change of the first digital signal;
    identifying a time in the received audio at which the derived rate of change exceeds a threshold as the onset of the sonic event of interest; and
    editing the received audio to insert an audio clip at a point in time in the received audio related to the onset of the sonic event of interest.

14. The method of claim 13, wherein detecting further includes comparing the second digital signal to a threshold value corresponding to the sonic event of interest and reporting the onset of the sonic event of interest if the second digital signal exceeds the threshold value.

15. A system for editing received audio by detecting an onset of a sonic event of interest in the received audio, wherein the sonic event of interest is characterized by a threshold value representative of a change in volume associated with the onset of the sonic event of interest, the system comprising:
    means for receiving a first digital signal corresponding to the received audio;
    a processing means responsive to the first digital signal for generating a second digital signal representative of perceived volume of the first digital signal;
    a differentiator responsive to the second digital signal for producing a third digital signal representative of the rate of change of the second digital signal;
    a detector responsive to the third digital signal and the threshold value for identifying the onset of the sonic event of interest if the rate of change of the perceived volume represented by the third digital signal exceeds the threshold value; and
    an editing system that edits the received audio to insert an audio clip at a point in time in the received audio related to the onset of the sonic event of interest identified by the detector.

16. The system of claim 15, wherein the processing means includes a high-pass filter for generating a digital signal without inaudible low frequencies.

17. The system of claim 16, wherein the high-pass filter is a Butterworth filter.

18. The system of claim 17, wherein the high-pass filter is a second order Butterworth filter with a cut off frequency of 120 Hz.

19. The system of claim 15, wherein the processing means further includes an energy generator for generating an energy signal from the digital signal without inaudible low frequencies.

20. The system of claim 19, wherein the processing means further includes a low-pass filter for filtering the energy signal.

21. The system of claim 20, wherein the low-pass filter is a Butterworth filter.

22. The system of claim 21, wherein the low-pass filter is a second order Butterworth filter with a cut off frequency of 120 Hz.

23. The system of claim 20 wherein the processing means further includes a means for taking a positive square root of the energy signal to produce a digital signal representative of volume of the audio stream.

24. A computer readable medium for storing computer instructions thereon, wherein the computer instructions, when executed by a computer, cause the computer to perform a method for editing received audio by detecting an onset of a sonic event of interest in the received audio, comprising:

generating a first digital signal representative of perceived volume of the received audio;

deriving a second digital signal corresponding to the rate of change of the first digital signal;

identifying a time in the received audio at which the determined rate of change exceeds a threshold as the onset of the sonic event of interest and editing the received audio to insert an audio clip at a point in time in the received audio related to the onset of the sonic event of interest.

25. The method of claim 24, wherein the detecting further includes comparing the second digital signal to a threshold value corresponding to the sonic event of interest and reporting the onset of the sonic event of interest if the second digital signal exceeds the threshold value.

26. A method for editing received audio by detecting an onset of a sonic event of interest in the received audio, comprising:

generating a signal representative of perceived volume of the received audio;

determining a rate of change in the perceived volume of the received audio;

identifying a time in the received audio at which the determined rate of change exceeds a threshold as the onset of the sonic event of interest; and editing the received audio to insert an audio clip at the time in the received audio identified as the onset of the sonic event of interest.

27. A method for editing received audio by detecting an onset of a sonic event of interest in the received audio, comprising:

band-pass filtering the received audio to provide a signal indicative of perceived volume of the received audio;

identifying a time in the band-pass filtered received audio at which the rate of change of the amplitude of the band-pass filtered received audio exceeds a threshold as the onset of the sonic event of interest; and editing the received audio to insert an audio clip at the time in the received audio identified as the onset of the sonic event of interest.

\* \* \* \* \*